United States Patent Office 3,532,613
Patented Oct. 6, 1970

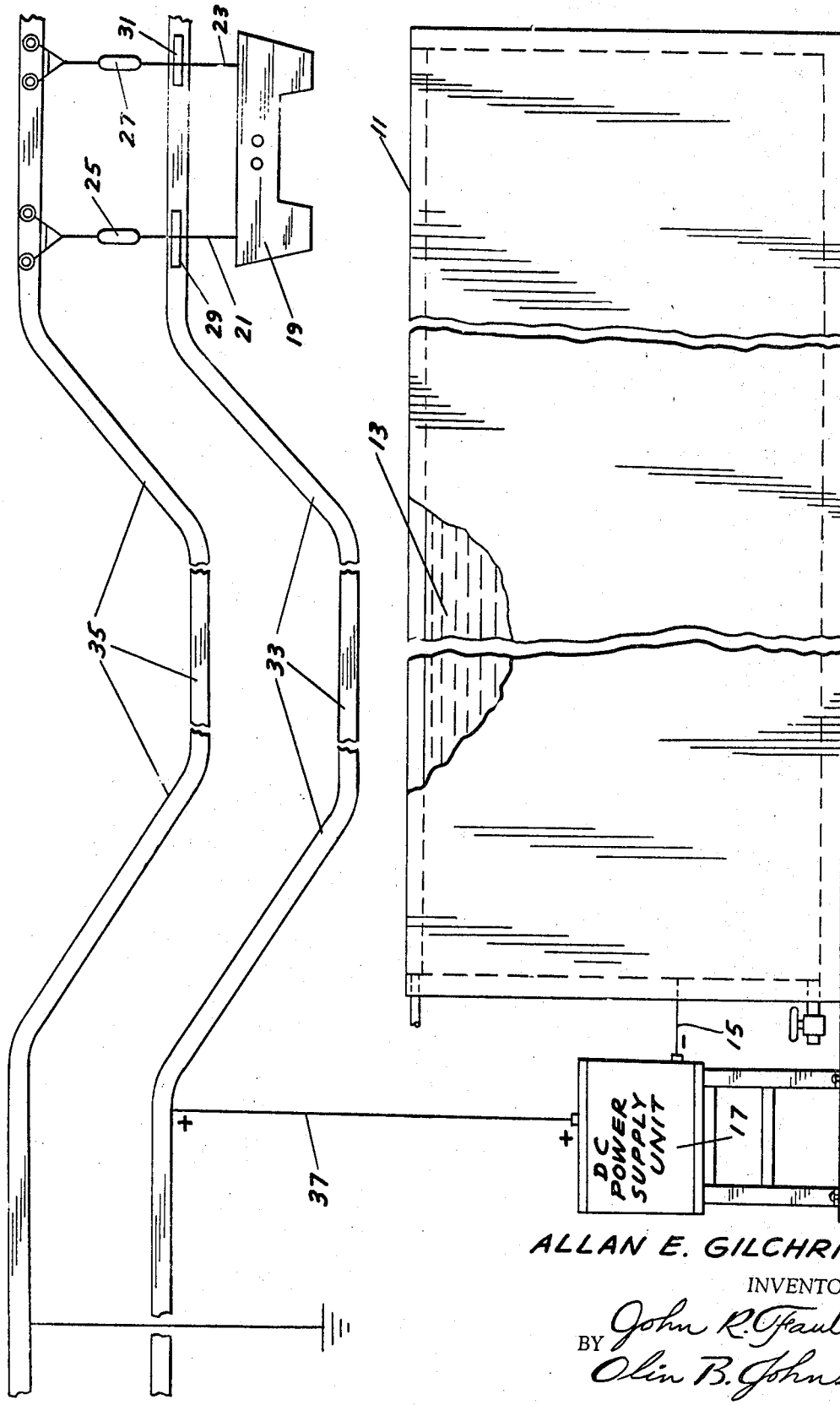

3,532,613
ELECTROCOATING PROCESS
Allan E. Gilchrist, Westlake, Ohio, assignor to Ford Motor Company, Dearborn, Mich., a corporation of Delaware
Continuation-in-part of application Ser. No. 375,633, June 16, 1964. This application Jan. 4, 1966, Ser. No. 518,620
Int. Cl. B01k 5/02; C23b 13/00
U.S. Cl. 204—181          6 Claims

ABSTRACT OF THE DISCLOSURE

In the process of electrodepositing paint upon an electrically conductive workpiece from an aqueous dispersion of the paint wherein the major fraction of the paint binder resin is a synthetic polycarboxylic acid resin, a minor fraction of discrete solid particles of an essentially nonionic adjunct resin are codispersed with the synthetic polycarboxylic acid resin and codeposited with the polycarboxylic acid resin upon the electrically conductive workpiece. The adjunct resin is fusible with the polycarboxylic acid resin at paint-baking temperature.

---

This application is a continuation-in-part of my copending U.S. patent application Ser. No. 375,633 filed June 16, 1964, now abandoned. Application S.N. 375,633, now abandoned is in turn a continuation-in-part of my copending U.S. patent application S.N. 304,297, filed Aug. 14, 1963, now U.S. Pat. 3,230,162 and my copending U.S. patent application S.N. 273,270, now abandoned filed Apr. 16, 1963. Application S.N. 304,297 is in turn a continuation-in-part of my now abandoned U.S. patent application S.N. 249,812, filed Jan. 7, 1963, which was a continuation-in-part of my copending U.S. patent application S.N. 186,320, now U.S. Pat. 3,351,575, filed Apr. 10, 1962, and my now abandoned U.S. patent applications Ser. Nos. 132,303, filed Aug. 18, 1961; 183,024, filed Mar. 28, 1962; 186,496, filed Apr. 10, 1962; 202,691, filed June 15, 1962; and 218,575, filed Aug. 22, 1962. Application S.N. 273,270 now abandoned is in turn a continuation-in-part of my now abandoned U.S. patent application S.N. 249,812 and my copending U.S. patent application S.N. 258,913, now abandoned filed Feb. 15, 1963. Application S.N. 258,913 now abandoned is a continuation-in-part of my aforementioned U.S. patent applications S.N. 249,812; 186,320; 132,303; 183,024; 186,496; 202,691; and 218,575. The disclosures of these applications are incorporated herein by reference.

This invention relates to the coating of an electrically conductive object by electrically induced deposition of a film-forming organic resin having free or dissociable carboxylic acid groups in its molecular structure and subsequent curing of the electrodeposited coating, to the modification of this method of coating and resultant coatings, and to novel coating compositions for use in such method.

Electrocoating or electropainting from an aqueous bath containing an intimate dispersion of a polycarboxylic acid resin, water soluble amino compound and optionally particulate infusible pigment, is carried out at a voltage above the threshold deposition voltage characteristic of the acid resin employed, i.e. the voltage at which deposition of the dispersed resin is initiated upon an electrically conductive workpiece when a direct electric current is passed through the bath between the workpiece and a second electrode that is electrically negative in relation to the workpiece, spaced apart from the workpiece, and in electrical contact with the bath. With coating compositions now available this voltage may be as low as about 20 volts but is advantageously between about 50 and about 500 volts, more commonly about 150 to about 300 volts. The maximum tolerable voltage is slightly below the rupture voltage of the resin employed, i.e. that voltage at which a resin film already laid down by this method ruptures upon continued application of such voltage during the immersion of the workpiece for coating.

This process may be advantageously modified to provide novel coatings by incorporating in the film deposit, as an addition to the film-forming polycarboxylic acid resin, a minor amount of an essentially nonionic, particulate adjunct resin that is fusible with the film-forming polycarboxylic acid resin at temperatures conventionally employed for baking paint on metal articles, or at lower temperatures. The term "fusible" as employed herein shall be understood to include both chemical reaction of the polycarboxylic acid resin and adjunct resin by addition, condensation, polymerization, etc., and physical blending of the same resulting from softening and/or melting of the adjunct resin during the baking cycle.

At least the major fraction of the primary or binder resin employed in this method is a synthetic polycarboxylic acid resin. The binder resin serves as a binder for infusible pigment, i.e. mineral pigment or organic particles that are infusible at the curing temperature, and serves to hold the codeposited fusible adjunct resin in place prior to curing.

Some hard resin particles which are not structurally ionic and not film forming upon electrodeposition are later fusible at curing temperature, e.g. upon baking at 120–260° C. and various types of such resins can even react with the electrodeposited polycarboxylic acid binder suitably on forced curing for imparting special properties to the resulting cured film such as fire retardance or durability. Examples of such readily fusible resins include dicyclodiepoxy resins, polyethylene resins, polyvinyl chloride resins, certain phenol formaldehyde resins such as those modified with rosin, powdered chlorinated hydrocarbon waxes, epichlorohydrin-bisphenol type epoxy resins advantageously having molecular weight about 1,000 or higher to resist hydrolysis in the bath, chlorinated rubber, vinyl acetate-vinyl chloride copolymers, and mixtures of same that melt and coalesce at the forced curing temperature.

The preferred polycarboxylic acid binder resins have an electrical equivalent weight between about 1,000 and about 20,000 and an acid number between about 30 and about 300.

A component pigment in the sense used here is one which is infusible at the anode curing temperature used subsequently to electrocoating a paint film thereon and thus remains as discrete solid particles in the resulting cured film. Curing is performed to obtain a tack-free paint surface, and customarily is done by baking in air at a temperature up to about 260° C. The electrodeposited film can be cured by itself, or, while still tacky, by spraying or otherwise mechanically applying a topcoat enamel or similar surface coating in some cases, and the two thus-applied coats force cured together to constitute subsequent curing for the purposes of this invention. The film-forming paint binder resin in my electrocoating operation coalesces on the anode immersed in the bath during the electrocoating operation to hold the discrete paint solids onto the anode so that the anode can be removed from the painting bath and further handled. The term "paint" as used herein is a composition comprising film-forming binder and particulate solids.

In some of my painting compositions the pigmentation can be with a single component pigment, e.g. a pigmentary grade of titanium dioxide, but more generally the overall pigmentation is made from a plurality of component pigments to achieve various special properties, colors, economies, sag resistance, etc. My electrocoating bath composition must have a binder resin-to-pigment ratio of at least about 2:1 by weight to yield a film which does not appear to be dried out and chalky and thus have impaired strength and corrosion resistance. Advantageously, for efficiency and obtaining the best quality electrodeposition, the binder resin-to-pigment ratio in the bath composition is higher, at least about 2.5:1. I have used successfully binder resin-to-pigment ratios as high as 50:1 and even higher, and the ratio can be as high as about 100:1 and higher and still be in a compositional range wherein pigment effects are consequential and important, e.g. for color, resistance to film degradation, apparent bodying, corrosion resistance, etc.

Especially pertinent in this regard is my finding that component pigment solids sustained in my electrocoating bath migrate to the anode more rapidly in the electrocoating operation than does my binder resin when both are considered in bulk, the resin having roughly 70-80% and typically about 75% of the apparent velocity of the pigment. This is shown by a significantly lower weight ratio of film-forming binder resin-to-pigment in the resulting film electrodeposited on the anode than the film-forming binder resin-to-pigment weight ratio of the bath suspension. The ratio in the deposited film is broadly dependent upon and appreciably lower than the concentration of binder resin-to-pigment in the operating bath from which it is deposited. Because of this disproportionate deposition of resin and pigment, establishment and maintenance of a proportion of binder resin relative to pigment in the bath above that desired in the electrodeposited film is essential to obtain consistent pigmented film quality, and because the disproportionation is in the direction of dried-out, chalky film formation, the maintenance of the ratio becomes quite critical when the lower limiting binder resin-to-pgment ratio is approached to obtain especially durable films from the resin and pigment selected for a standardized operating condition. This is contrary to my experience with conventional pigmented painting compositions wherein weight ratios of binder resin-to-pigment often can be below 1:1 with good film formation and there is no disproportionation factor to be considered.

In my painting bath composition the film-forming binder resin-to-pigment ratio generally is between about 1.25 and 1.4 times that of the film desired to be deposited because of the disproportionation effect. As the kind of binder resin and pigment used and the operating conditions of temperature and voltage can be varied substantially from one particular electrocoating operation to another, it is particularly advantageous to predetermine, e.g. in a small scale trial, a particular resin-to-pigment ratio for the bath, not lower than about 2:1, necessary for electrodepositing a film therefrom having a desired resin-to-pigment ratio under the particular electrocoating conditions selected.

In practice I generally replenish the bath gradually, that is, continuously or incrementally, with a replenishment composition comprising said binder resin and pigment proportioned to maintain the resin-to-pigment ratio of the bath approximately at the elevated predetermined value, the total replenishment being substantially equal over a sustained operating period to the amount of the binder resin and pigment deposited on the anodes coated. The high solids content replenishment composition for dispersion into my painting composition comprises the intimate mixture of the aforesaid pigment and binder resin in a resin-to-pigment ratio of at least about 1.5($\pm$0.1):1, this ratio being the approximate lower limit for maintaining the electrocoating bath in sustained operation in a manner to preclude the electrodeposition of chalky, binder-starved appearing films. Advantageously, the ratio is even higher for insuring good film quality conveniently with control tolerance, e.g. at least about 2:1.

The component pigments of my compositions, and by pigment I mean to include for my purposes solid phase fillers as well, are infusible upon subsequent curing. Curing temperature in the instant invention must be sufficient to effect the aforedescribed cross-linking and/or physical blending of the adjunct resin with the primary resin. Under forced curing some organic particles that are electrodeposited in solid state can melt, coalesce, and smooth out; thus, they are not pigmentary for purposes of that operation, but the same particles are pigmentary in a similar operation where the curing is done at a temperature when they are infusible and remain as discrete particles after curing.

Generally the component pigments are mineral in nature, for example, titanium dioxide, zinc oxide, leaded zinc oxide, white lead, titanium calcium (a composition of titanium dioxide and calcium sulfate), clays such as kaolinite, silica, talc, mica, wollastonite, calcium carbonate, barium sulfate, ferrite yellow oxide, ferric oxide, "brown" iron oxide (which is a blend of red, yellow and black iron oxides), tan oxide of iron (which is a similar blend), ultramarine blue, raw sienna, burnt sienna, raw and burnt umber, chromium oxide green, graphite, carbon black, zinc chromate, lampblack, calcium phosphate, calcium lead chromate, calcium phytate, chrome orange, cadmium reds and yellows, alumina, and elemental metal powders such as zinc, aluminum, magnesium, and copper. It is advantageous that water soluble salts in the pigments, such as sodium or potassium salts, are very low and preferably absent so that the electrical resistance of the bath and the film deposition is not subject to uncontrolled variation, and that the primary control of electrical conductance is by means of the binder resin and amino compound dispersed in the bath.

The component pigments can also be organic such as the green iron salt of nitroso beta naphthol, copper phthalonitrile blue, toluidine red, parachlor red, para toner (red), alkali resistant red, BON red and maroon, Wachtung red, madder lake red, Duratone red, carmine red, and Hansa yellows. Hard resin particles that are not structurally ionic polyelectrolytes in the painting bath and which remain as discrete solid particles and do not fuse with each other in the freshly electrically deposited film at curing temperature are considered broadly as component pigments for my purpose. Typically the solubility of such hard resins in aqueous alkaline dispersion is less than about 1% and they have low acid value for package stability.

Fusible resin particles deposit on the anode in the same disproportionate way as do mineral pigments and infusible resin particles. When they are fused into a film subsequent to electrodeposition, their particulate character disappears and allowance for this fact is taken into consideration in computing resin-to-pigment ratio because they do not coalesce in the electrodeposition nor do they have permanent infusible particulate effect. Ordinarily they can be used in a proportion up to about 40 and for efficiency preferably not more than 20-25 parts per 80 parts of the synthetic polycarboxylic acid resin electrocoating binder without substantially detracting from electrodeposition of a good film. For purposes of suspension in the bath and even distribution in the resulting electrodeposited film the particle size of such fusible resins should be very small, preferably no larger than 5 microns average with no more than about 5% exceeding 10 microns. Depending somewhat upon the adjunct resin added and the desired end coating, advantageous use of such resins is available in a range of about 1 to about 30 weight percent of the resin dispersion consisting essentially of the binder resin and the adjunct resin, more commonly 5 to 25 weight percent.

Because the film-forming polycarboxylic acid binder resin has the attributes of a solute in the bath as distinguished from a latex, the bath viscosity builds up substantially with increasing resin concentration. The small particle size pigments also tend to thicken the bath. For good handling properties the bath is limited to a maximum concentration of 35% by weight of painting solids (N.V.M.), advantageously to about 15% and preferably, for best all-round painting performance, about 5–12%. Respecting the other limit, extremely low concentrations of polycarboxylic acid binder resin give very poor electrodeposition with respect to evenness, smoothness, and adhesion. Accordingly, the lower limit of painting solids for good performance is limited to about 2% by weight in the bath. To achieve low bath viscosity for purposes of good heat transfer and prevention of too much paint from dragging along when the coated anode is withdrawn from the bath, the bath can contain broadly between about 65% and 98% water and advantageously about 85–98% water.

Additionally, I have found that very small particle size of all of the component pigments is essential. This is quite in contrast with conventional painting formulations which frequently incorporate component pigment solids of average size well above this with quite good success, for example, component pigments having about 10–30 microns average, and up to about 44 microns. Preferably, for best performance, the average particle size of each such infusible pigment component should be not substantially greater than about 2 microns for my purposes. The major reasons for limiting such pigmentation strictly to such critically fine sizes are these: the comparatively high viscosity of a freshly-electrodeposited resin which has electrical equivalent weight of at least about 1,000 substantially restricts diffusion, mobility or leveling of the codeposited pigment in the electrodeposited film even when it is further cured at an elevated temperature in the range of 120° to 200° C. or higher, the critically small particle size pigment being distributed much more uniformly than coarser material from top to bottom in such film; the high electrical resistance that develops in such resin upon electrodeposition restricts practical film thickness to a comparatively low value so that coarser pigment fractions present often give undesirable roughness and/or apparent nonuniformity across an expanse of deposited film; and I have found that there is some resin binder enrichment at the base of the film in contact with the anode which enrichment is especially pronounced when coarser pigments are present and not particularly significant when using the critically smaller sized pigments. Where homogeneity of the film is particularly important, I prefer that not only the infusible component pigments, but all particulate materials in the bath are within the critical size limitation.

Furthermore, in view of the necessary comparatively high binder resin-to-pigment ratio required in the film, the critically small pigments can in some cases improve durability of the film, whereas coarser pigments of the same kind usually will not. The pigment sizes I describe here are for equivalent spherical diameters. In addition to being essential for superior film in this type of electrocoating, the small size pigment provides for easy mechanical suspension during the coating operation and easy redispersion after settling from a shutdown period.

When a component pigment is fairly dense, e.g. above about 3.5 relative to water, use of a low average particle size of such component pigment not substantially in excess of about 2 microns is particularly advantageous for my purposes; when the component pigment has a lower density than this, the average particle size limit can approach about 5 microns without substantial sacrifice in performance. When infusible pigments are available that have substantially no particles larger than about 10 microns, the use of such pigments is preferred for electrodepositing the best sort of film. However, as many useful pigment components are comminuted from larger particles and then subject to imperfect or incomplete classification procedures, if any, it is usually not economical or practical to remove or avoid minute amounts of oversize material. Thus, as much as about 5% and preferably not more than about 2% by weight of an infusible component pigment can be oversize, that is, above 10 microns, without substantial sacrifice in performance, but virtually nothing should be coarser than about 44 microns for good suspension in the bath or detraction from good film appearance.

Temperature of the bath body normally is between about 15° and about 50° C., occasionally somewhat warmer, in an extended electrocoating operation. Preferably, however, the temperature for best film deposition is in the range of 20–35° C., and maintenance of bath temperature in this range is thus perferred. The bath is agitated to assist suspension of insoluble solids, to help disperse high solids content additions, and to maintain substantially uniform temperature of the anode surfaces.

The preferred polycarboxylic acid resins for making at least the major fraction of film-forming binder resin for this invention are those disclosed in my copending U.S. patent application S.N. 304,297, now U.S. Pat. 3,230,162 and have electrical equivalent weight broadly between about 1,000 and about 20,000, the electrical equivalent weight being measured as defined in that copending application. Advantageously, the polycarboxylic acid resin comprises a coupled siccative glyceride oil reacted under substantially anhydrous conditions with about 2–25% of a polymerizable vinyl monomer. In some cases vinyl polymers such as dicyclopentadiene resins can be used to replace part or all of the vinyl monomer to raise the electrical equivalent weight of the acid resin. Preferably, the vinyl monomer is vinyl toluene limited to about 15% maximum on the weight of the coupled oil, and this resin is extended with non-heat reactive phenol aldehyde resin at an elevated temperature sufficiently long to achieve ostensible chemical union between the polycarboxylic acid resin and their extender so that there is no appreciable dissociation of acid resin and extender in a sustained electrocoating operation, and the product can be considered as a compound rather than a mixture of two compounds. Other extender resins and film plasticizers which coalesce on the anode during the electrodeposition to become effectively part of the paint film binder at that stage can be used as a minor fraction of the film-forming binder. The concentration of such materials should be limited so as not to mask the unique electrical migration characteristics and structural anionic polyelectrolyte behavior of the principal and essential acid resin binder. For best electrodeposition performance, my film-forming binder consists essentially of synthetic polycarboxylic acid resin of the controlled high electrical equivalent weight. The useful binder compositions are film-forming at the electrodeposition bath temperature and are curable to a tack-free film, as for example, by baking at a temperature of 120–260° C. for about 2–20 minutes. Before curing they hold solid phase substances tenaciously to the anode. These features are discussed at length in my copending application S.N. 304,297, now U.S. Pat. 3,230,162.

Other suitable synthetic polycarboxylic acid resins for my binders include, for example, alkyd resins and acrylic acid and lower alkyl ($C_{1-4}$) substituted acrylic acid-containing polymers, i.e. those having carboxyl groups contributed by alpha, beta carboxylic acids or residues of these acids, having a comparatively high electrical equivalent weight. The comparatively high electrical equivalent weight of the useful synthetic polycarboxylic acid resins for my purpose causes them to convert from dispersed current-carrying anions in the bath to a water resistant and electrically resistant material upon electrodeposition. Their electrical equivalent weight should not be above 20,000 for ease of dispersion and efficiency of operation. The preferred synthetic polycarboxylic acid resins for my purpose have electrical equivalent weight between about 1,000 and 2,000 for deposition of films approaching about 25–50 microns in practical short operating times, e.g. 1–3 minutes. Where a thinner film is desired the electrical equivalent weight advantageously can be as high as about 5,000.

In addition to use of resinous extenders and film plasticizers of conventional nature, the binder resin can have mixed with it between about 0.1 and about 10%, basis weight of the polycarboxylic acid resin in the bath, of a nonionic organic liquid compatible with the resin in the bath dispersion as a solubilizing assistant or, more accurately, dispersion modifier as shown in my copending application S.N. 304,297, now U.S. Pat. 3,230,162. Preferably, these volatilize from the electrodeposited film on forced curing. The proportion of such nonionic organic liquid assistant should be insufficient to form a distinct phase in the bath composition. Typical assistants are: petroleum naphthas, specifically aliphatic naphthenic and aromatic hydrocarbons or mixtures of same having boiling point between about 30° C. and about 240° C. and preferably between about 150° and 200° C. so that they will volatilize from the film on baking or other curing such as air curing; pine oil, glycerine, water soluble alkoxy alkanols such as 2-butoxy-ethanol-1 and other ethylene oxide derivatives of this type, and mono alkyl ethers of glycols such as the monobutyl ether of diethylene glycol. Usually 0.1–6% basis polycarboxylic acid binder resin in the bath is adequate for all purposes.

Additionally I can use about 1–20% if desired, and most suitably not more than about 5–15%, basic weight of the polycarboxylic acid binder resin, of a polybasic carboxylic acid of molecular weight below 1,000 for an amine scavenger. Advantageously, such scavenging acids are polymers of polyenoic acid having 12–44 carbon atoms, preferably the so-called "dimer" acids which are predominantly the dimer of $C_{18}$ unsaturated fatty acids, principally linoleic with some trimer present. These form soaps readily with polyamines at temperatures below about 75° C. and upon codeposition with the film and curing can provide a polyamide material in the resulting film. Those of elevated boiling point such as the "dimer" acids also can help to plasticize the film and to assist in giving good bond to a subsequent paint coating applied by dip, spray, brush, or roll when the electrically deposited undercoat has been subjected to "overbaking"— exposure to a temperature of about 175°–260° C. which usually detracts from the intercoat adhesion.

The useful amines in my bath composition and replenishment composition therefor are the water soluble amino compounds as described and set forth in S.N. 304,297, now U.S. Pat. 3,230,162 preferably with 30–60% of the amino equivalents present being contributed by water soluble polyamine. Advantageously, pH of the bath composition is not more than about 8.3 to suppress sorption of $CO_2$ from ambient air, and generally it will be broadly between about 5 and 8.2 at room temperature. Specific resistance of the bath composition as made up is advantageously between about 700 and about 1,000 ohm-centimeters to deposit about 25 microns thick as a priming coat, while higher bath resistance gives a thinner film and vice versa. Upon electrodeposition I estimate that the film should have at least about 40,000,000 ohm-centimeters apparent specific resistance to obtain good throw into interstices and limitation of film thickness to comparatively thin values as electrodeposition proceeds. Advantageously, this apparent specific resistance of film is even higher, preferably at least about 75,000,000 ohm-centimeters for films less than 25 microns thick. Such apparent specific resistance includes a surface resistance factor for the bath-deposited film interface and the film-substrate interface.

The high solids content replenishment composition for sustained operation of the painting bath preferably is, on a pigment and filler free basis, between about 40 to 95%, preferably 50 and 95%, by weight film-forming (straight or extended) resin binder, the upper concentration being so limited to avoid extremely refractory handling properties, and the lower for economy and avoiding the handling of a good deal extra water. While the bath can be replenished with an intimate mixture of pigment and film-forming binder resin, considerable mechanical work is required to achieve the incorporation of that material; accordingly, I have found it advantageous to use up to about 2 parts by weight of water per part of binder resin plus pigment for the replenishment composition.

Preferably, the replenishment composition also contains a small amount of water soluble amino compound such as a water soluble monoamine, e.g. up to about 10% basis weight of the binder resin and more preferably about 1–3% to assist in dispersing the replenishment composition into the bath. Such amino compound in the replenishment composition also assists in hydrating any anhydride groups that are present in conjunction with water in the replenishment composition, thus enhances its dispersibility in the bath. The replenishment composition also can contain for efficiency and convenience, in addition to a controlled proportion of binder resin and pigment, water-soluble amino compound, the small desirable proportions hereinbefore stated of nonionic organic liquid solubilizing assistant and low molecular weight polycarboxylic acid amine scavenger so that the replenishment operates to keep the bath in compositional balance in all respects.

Referring to the accompanying schematic drawing depicting one embodiment of apparatus suitable for carrying out the method of this invention, there is shown a steel tank 11 which contains a painting bath 13 and serves as a negative electrode in the coating process. Tank 11 is electrically connected to D.C. power supply unit 17 via conductor 15. An article to be coated 19, e.g. an automobile body, is shown suspended from a conveyor 35 by hangers 21 and 23. Conveyor 35 is a conventional, electrically powered, chain driven conveyor constructed and arranged for the transportation of articles to be coated through bath 13. Hangers 21 and 23 include insulators 25 and 27, respectively, which insulate article 19 from the grounded conveyor. Contact plates or brushes 29 and 31 are attached to and in electrical connection with hangers 21 and 23, respectively. Article 19 is shown approaching bath 13 and in electrical connection with bus bar 33 which in turn is in electrical connection with D.C. power supply unit 17 via conductor 37. Article 19, therefore, serves as the positive electrode of an electrodeposition cell while the article is passing through bath 13.

It is to be understood that bus bar 33 may be segmented and that certain of the various segments may have no connection with the power supply unit or may be adapted for polarity reversal to provide additional control over the coating process.

Power supply unit 17 is constructed and arranged to provide between the electrodes and through the coating bath a direct current flow of electrical energy that is commensurate with the size of the electrocoating operation contemplated. Design of the power supply unit should take into consideration the surface area of the workpieces that will be in residence within the coating bath at any given time, the workpiece surface area entering the bath per unit time, the deposition properties of the coating formulation, the conductivity of the coating bath, the thickness of the coating to be formed, etc. Ordinarily, such current will be provided by rectification of an alternating current power source by conventional means.

The following examples show ways in which my invention can be practiced, but should not be construed as limiting the invention. The electrical equivalent weights of the polycarboxylic acid resin binders are between 1000 and 2000. All parts are parts by weight and all percentages are weight percentages in this application unless otherwise expressly indicated.

EXAMPLE 1

A paint binder is made by reacting in an agitator tank 8,467 parts of alkali-refined linseed oil and 2,025 parts of maleic anhydride (heated together at 232.2° C. for about three hours until an acid value of 80–90 results), then cooling this intermediate to 157.2° C., adding 1,789 parts of vinyl toluene containing 48 parts of ditertiary butyl peroxide and reacting at 216° C. for about an hour. It has acid number of 75–85 at this stage. The resulting vinyl toluenated material is then cooled to 190° C. and 2,647 parts of non-heat reactive, thermoplastic, oil-soluble phenolic resin are added, the temperature goes to 177° C. and the mixture held one hour to unite the acid resin and extender, then cooled to about 150° C. and strained. The phenolic resin is a solid lump resin having softening point of 120–140° C., specific gravity of 1.03–1.05 at 20° C., and has been stripped to get out excess phenol and low molecular weight materials. It is a condensation product of about equimolar quantities of para tertiary butyl phenol and formaldehyde. The electrical equivalent weight of the resulting acid resin as extended is about 1400.

A thick blend is then made by mixing together 2,400 parts of the foregoing extended acid resin with 211 parts of water, and 29 parts of triethylamine, then adding and mixing in 25 parts of mineral spirits, a light hydrocarbon liquid having API gravity of 45–49.5, specific gravity at 15.6° C. of 0.78–0.80, flash point (Cleveland Open Cup) between 37.8 and 46° C., a negative Doctor test and no acidity, 50 parts of 2-butoxyethanol, 100 parts of pine oil, 15 parts of antifoam agent (a ditertiary acetylenic glycol with methyl and isopropyl substitution on the tertiary carbon atoms), and 1,615 parts of pigment grind.

The pigment grind is made of 497.1 parts of fine kaolin clay having average particle size of 0.55 micron with particle size distribution as follows: 95% less than 2 microns, 50% less than 0.55 micron, 20% less than 0.35 micron; 243 parts of pigmentary titanium dioxide having average particle size about 0.3 micron and substantially no particles as large as a micron; 16.6 parts of fine lead chromate having average particle size of 0.1–0.5 micron with less than ¼% of the particles exceeding 44 microns; 146.4 parts of fine red iron oxide having average particle size of 0.55–0.6 micron with less than ½% of the particles exceeding 20 microns; 2.8 parts of carbon black having average particle size of about 25 millimicrons with less than 0.2% particles exceeding about 44 microns; 262.5 parts of a mixture containing 104.8 parts of a vinyl toluenated, maleic coupled linseed oil made in the same manner as the resin hereinbefore shown in this example (except that the resulting polycarboxylic acid resin is not extended with any phenolic resin), 25 parts of diisopropanol amine, and 132.7 parts of water; 408.9 parts of additional water; 1.7 parts of the acetylenic glycol antifoam agent referred to above; and a mixture of 18 parts of diisopropanol amine and 18 parts of water.

The resulting thick blend, 4,445 parts, is mixed with 3,517 parts of water and 500 parts of a neutralizing solution consisting of 12.4% diethylene triamine, 43.8% diisopropanol amine, and 43.8% water to yield 8,462 parts of heavy paint having about 40.7% total solids (N.V.M. after 20 minutes at 176.7° C.). To this body of heavy paint is added 29,804 parts of water to yield a bath dispersion of 38,266 parts having 9% total solids by weight. For practical estimation purposes the nonvolatile matter can be taken as the resins plus pigments, and all else can be considered volatile.

The cathode is an agitated metal tank holding 1,000 parts of the bath composition at 9% solids and surrounding the anode with about 2.5 cm. clearance at the sides and bottom. The anode is a 0.102 meter x 0.102 meter square of 24 gauge sheet steel. Voltage across anode to cathode is constant at 350. The anode linear insertion rate is 0.3 meter per minute, and the anode immersed to a depth of .089 meter. In the painting operation the tank temperature is controlled between 21° and 350° C. The specific resistance of the bath initially is 750–1050 ohm-centimeters.

The resulting coated anode is removed from the bath with power on after 60 seconds have elapsed. The anode coating has resin-to-pigment ratio of about 2.1:1, whereas the original bath dispersion has resin-to-pigment ratio of 2.8:1 and is of sufficient volume to remain substantially constant, although decreasing very slightly, during the one-minute run.

The anode is baked for 15 minutes at 176.7° C. The coating before baking has no visible surface irregularities, and the film is slightly tacky. Adhering droplets are blown off with air. After baking the film exhibits excellent adhesion and is pore-free and durable, exhibiting standard salt spray resistance in excess of 250 hours. The cured paint film is smooth, even, of uniform sheen, and about 25 microns thick.

For sustaining this operation, a high painting solids content (74.5%) replenishment composition is made like the foregoing thick blend except that 2,185 parts of the pigment grind is used, the weight ratio of binder resin-to-pigment being 2.1:1.

A succession of panels are electrocoated like the first one. For every 10 parts of paint solids deposited on the panels about 13.4 parts of the replenishment composition and 0.275 part of aqueous amine solution (12.4% diethylene triamine, 43.8% diisopropanol amine, and 43.8% water) are stirred into the bath to maintain both solids content between 8 and 9%, with a small amount of additional water being added periodically to maintain bath volume essentially constant for evaporation and entrainment losses. The electropainting and curing operations yield a series of panels essentially of the same good quality as the first one and substantially consistently having a binder resin-to-pigment weight ratio of about 2.1:1, while the binder resin-to-pigment weight ratio in the bath composition is thus maintained at about 2.8:1.

EXAMPLE 2

An acrylic resin is made by slowly adding a mixture of 60 parts of butyl acrylate, 25 parts of styrene, 15 parts of methacrylic acid, 1 part of t-butyl perbenzoate, and 1 part of benzoyl peroxide into 34.7 parts of 2-butoxy ethanol maintained at 157.2–160° C. during a 2½ hour period and is held for an additional hour at this temperature using an agitated reactor equipped with a reflux condenser. The resulting resin is cooled to 137.8° C. and further reacted for ½ hour at 154.4° C. with 10 parts of tri hydroxyl methyl amino methane.

500 parts of the above described acrylic resin are blended with 94.2 parts of a 50% by weight diisopropanol-amine-water solution and further reduced with water to give a 40% resin solids dispersion.

A pigment grind is made up by grinding together 79 parts of this reduced acrylic resin dispersion, 76 parts of titanium dioxide, 18.7 parts of fine kaolin clay, and 78.3 parts of water, the titanium dioxide and clay being the same kinds as used in Example 1.

A second mixture is ground together; it has 106 parts of very finely-powdered polyvinyl chloride-vinyl acetate copolymer resin having melting point about 150° C., 89.7 parts of water, and 84.3 parts of the reduced acrylic resin dispersion.

A composition for electrodeposition is made by blending together 106 parts of the pigment grind, 75.8 parts of the copolymer resin grind, 134.5 parts of the 40% solids acrylic resin dispersion, and 693.7 parts of water. It has acrylic resin to mineral pigment ratio of about 1.9:1 and acrylic resin to particulate solids (that in mineral pigment plus polyvinyl chloride resin) of about 1.1:1. The electrodeposition is done like that of Example 1.

When such electrocoated anode is cured at room temperature, the film is poor and chalky because the film-forming binder resin-to-pigment ratio is about 0.87:1, with the hard copolymer resin effectively acting as a component pigment in such operation. However, when the electrocoated anode is cured by baking at 176.7° C. for 20 minutes, the film smoothes out to a good, serviceable film that is not chalky; it has an acrylic resin to infusible mineral pigment ratio of about 1.5:1 and this baked film is further enriched by the auxiliary binder of the hard copolymer resin to yield an overall resin-to-pigment ratio of about 2.2:1.

Similarly, good appearing films were electrodeposited on panels and baked using, for example, as the supplementary resin filming adjunct fusible on baking very finely-divided (a) chlorinated hydrocarbon wax; (b) epichlorohydrin-Bisphenol A type epoxy resin having molecular weight of about 1,000; (c) chlorinated rubber, and (d) rosin-modified phenolformaldehyde resin. Of these, Resin (b) is found to have cross-linked with the acid binder resin upon baking.

As aforementioned and illustrated, the essentially non-ionic, particulate, filming adjunct resins deposit from the bath in substantially the same manner as mineral pigment but if fusible at the temperature of baking become a part of the binder film either through chemical cross-linking or physical blending. In embodiments wherein such adjuncts are employed control of binder to pigment ratio in the film is provided by maintaining an ionic binder resin-to-pigment weight ratio in the bath of at least about 1.5:1, preferably at least about 1.7:1, and employing the fusible, particulate, filming adjunct in an amount sufficient to raise the total resin-to-pigment binder to at least about 2:1.

Since the particulate filming adjunct resin and mineral pigment deposits at substantially the same rate, maintenance of film composition may be controlled by employing a replenishment feed in which the weight ratio of filming adjunct resin-to-mineral pigment is substantially equal to the weight ratio of filming adjunct resin-to-mineral pigment in the bath and the weight ratio of ionic resin binder-to-mineral pigment is at least about 1.5:1.

It will be understood by those skilled in the art that modifications can be made in the details of the examples hereinbefore set forth without departing from the spirit and scope of the invention as expressed in the claims.

I claim:

1. In a coating process which comprises immersing a series of electrically conductive objects in a liquid coating bath having organic coating material dispersed therein and a first electrode in electrical communication therewith and spaced apart from said objects, providing a direct current of electrical energy through said bath and between said first electrode and an object of said series immersed in said bath thereby electrically inducing deposition of said coating material upon said object and forming a film thereof on said object, withdrawing the thus coated object from said bath, and curing and film, the improvement which comprises operating said coating process with said bath comprising a fluent intimate mixture comprising
   (a) water, and
   (b) a resin dispersion comprising
      (1) a major fraction of ionizable, film-forming binder resin, at least a major fraction of said binder resin being synthetic polycarboxylic acid resin, and
      (2) a minor fraction of discrete solid particles of an essentially nonionizable adjunct resin that will codeposit with said synthetic polycarboxylic acid resin as discrete solid particles when said direct current is provided between said first electrode and said object of the said series and is fusible with said polycarboxylic acid resin at paint-baking temperatures, and
   (c) sufficient water soluble amino compound to maintain said polycarboxylic acid resin as a dispersion of anionic polyelectrolyte in said bath,
and replenishing the resin content of said bath as said coating process continues with a replenishment composition comprising an intimate mixture comprising
   (a) water, and
   (b) a resin dispersion comprising
      (1) a major fraction of ionnzable, film-forming binder resin, at least a major fraction of said binder resin being synthetic polycarboxylic acid resin, and
      (2) a minor fraction of discrete solid particles of an essentially nonionizable adjunct resin that will codeposit with said synthetic polycarboxylic acid resin as discrete solid particles when said direct current is provided between said first electrode and said object of said series and is fusible with said polycarboxylic acid resin at paint-baking temperatures,
withdrawing said object from said bath and curing the resulting electrodeposited film thereon by heating said object to a temperature and for a time sufficient to fuse the component of adjunct resin therein with the electrodeposited component of said polycarboxylic acid resin therein.

2. In a coating process which comprises immersing a series of electrically conductive objects in a liquid coating bath having organic coating material dispersed therein and a first electrode in electrical communication therewith and spaced apart from said objects, providing a direct current flow of electrical energy through said bath and between said first electrode and an object of said series immersed in said bath thereby electrically inducing deposition of said coating material upon said object and forming a film thereof on said object, withdrawing the thus coated object from said bath, and curing said film, the improvement which comprises operating said coating process with said bath comprising a fluent intimate mixture of
   (a) water,
   (b) pigmentation consisting of at least one component mineral pigment, and
   (c) a resin dispersion comprising
      (1) a major fraction of ionizable, film-forming binder resin, at least a major fraction of said binder resin being synthetic polycarboxylic acid resin, and
      (2) a minor fraction of discrete solid particles of an essentially nonionizable adjunct resin that will codeposit with said synthetic polycarboxylic acid resin as discrete solid particles when said direct current is provided between said first electrode and said object of said series and is fusible with said polycarboxylic acid resin at paint-baking temperatures, and
   (d) sufficient water soluble amino compound to maintain said polycarboxylic acid resin as a dispersion of anionic polyelectrolyte in said bath,
the weight ratio of organic resin to mineral pigment in said bath being at least about 2:1, and replenishing the solids content of said bath as said coating process continues with a replenishment composition comprising an intimate mixture of
   (a) water,
   (b) pigmentation consisting of at least one component mineral pigment,
   (c) a resin dispersion comprising
      (1) a major fraction of ionizable, film-forming binder resin, at least a major fraction of said binder resin being synthetic polycarboxylic acid resin, and
      (2) a minor fraction of discrete solid particles of an essentially nonionizable, adjunct resin that will codeposit with said synthetic polycarboxylic acid resin as discrete solid particles when said direct current is provided between said first electrode and said object of said series and is fusible with said polycarboxylic acid resin at paint-baking temperatures, and (d) about 0.1 to about 10 weight percent water soluble amino compound basis weight of said binder resin, the weight ratio of said binder resin to mineral pigment in said replenishment composition being at least about 1.5:1 and the weight ratio of said adjunct resin to mineral pigment in said replenishment composition being substantially equal to that present in said bath, withdrawing said object from said bath and curing the resulting electrodeposited film thereon by heating said coated object to a temperature and for a time sufficient to fuse the component of said adjunct resin therein with the polycarboxylic acid resin component therein.

3. The process improvement of claim 2 wherein said adjunct resin has an average particle size not substantially above about 5 microns with no more than about 5% thereof being larger than about 10 microns.

4. The process improvement of claim 2 wherein both said adjunct resin and said mineral pigment have an average particle size not substantially above about 5 microns with no more than about 5% of either being larger than about 10 microns.

5. The process improvement of claim 2 wherein the major fraction of said binder resin in said bath and the major fraction of said binder resin of said replenishment composition is a synthetic polycarboxylic acid resin having electrical equivalent weight of about 1,000 to about 20,000 and acid number of about 30 to about 300.

6. The process improvement of claim 2 wherein said adjunct resin has average particle size not substantially above about 2 microns.

References Cited

UNITED STATES PATENTS

| | | | |
|---|---|---|---|
| 3,062,770 | 11/1962 | Hirsch et al. | |
| 3,230,162 | 1/1966 | Gilchrist | 204—181 |
| 3,362,899 | 1/1968 | Gilchrist | 204—181 |
| 3,366,563 | 1/1968 | Hart et al. | 204—181 |

FOREIGN PATENTS 676,155  12/1963  Canada.

JOHN H. MACK, Primary Examiner

N. A. KAPLAN, Assistant Examiner